(12) United States Patent
Okada et al.

(10) Patent No.: US 6,221,444 B1
(45) Date of Patent: Apr. 24, 2001

(54) LIQUID CRYSTAL DEVICE

(75) Inventors: Shinjiro Okada, Isehara; Hidemasa Mizutani, Sagamihara; Koichi Sato, Mitsukaido; Hirohide Munakata, Yokohama; Akira Tsuboyama, Sagamihara, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/326,555

(22) Filed: Jun. 7, 1999

(30) Foreign Application Priority Data

Jun. 10, 1998 (JP) .................................................. 10-162097

(51) Int. Cl.$^7$ .................................................. G02F 1/1337
(52) U.S. Cl. ........................ 428/1.25; 428/1.2; 428/1.27
(58) Field of Search .................................. 428/1.2, 1.27, 428/1.25

(56) References Cited

U.S. PATENT DOCUMENTS

| | | | |
|---|---|---|---|
| 4,137,192 | 1/1979 | Matsufuji | 252/299 |
| 4,572,617 | 2/1986 | Masaki et al. | 350/339 R |
| 4,577,930 | 3/1986 | Yang | 350/332 |
| 4,582,396 | 4/1986 | Bos et al. | 350/347 E |
| 4,714,323 | 12/1987 | Katagiri et al. | 350/350 S |
| 4,776,674 | * 10/1988 | Filas et al. | 350/340 |
| 4,783,148 | 11/1988 | Tsuboyama et al. | 350/341 |
| 4,816,178 | 3/1989 | Katagiri et al. | 252/299 |
| 4,844,597 | 7/1989 | Katagiri et al. | 350/350 S |
| 4,902,107 | 2/1990 | Tsuboyama et al. | 350/350 S |
| 5,034,152 | 7/1991 | Katagiri et al. | 252/229.65 |
| 5,136,408 | 8/1992 | Okada et al. | 359/56 |
| 5,372,745 | 12/1994 | Yoshinaga et al. | 252/299.01 |
| 5,400,159 | 3/1995 | Takao et al. | 359/76 |
| 5,422,748 | 6/1995 | Yamashita et al. | 359/75 |
| 5,423,286 | 6/1995 | Yonehara | 117/94 |
| 5,540,858 | 7/1996 | Yoshinaga et al. | 252/299.01 |
| 5,576,864 | 11/1996 | Takao et al. | 359/76 |
| 5,710,607 | 1/1998 | Iwamoto et al. | 349/660 |
| 5,746,939 | 5/1998 | Taniguchi | 252/299.01 |
| 5,854,665 | 12/1998 | Iba | 349/119 |

FOREIGN PATENT DOCUMENTS

| | | |
|---|---|---|
| 0 251 548 | 1/1988 | (EP) . |
| 2 309 539 | 7/1997 | (GB) . |
| 9-185032 | 7/1997 | (JP) . |
| 97/12275 | 4/1997 | (WO) . |
| 97/30107 | 8/1997 | (WO) . |

OTHER PUBLICATIONS

Miyashita et al., Preprint for L.C. Forum (1993) 2B13, 178–179.
Sueoka et al., IBM AM–LCD/IDW(1996) 133–5.
Noguchi, SID Digest (1997) 739–41.
Saito et al., Japan 5$^{th}$ Crystal Forum preprint (1979) 166.
Ekisha: Kishohan Liquid Crystals; Basics, (1985).
1998 SID International Symposium. Digest of Technical Papers, vol. 29, , Proceedings of SID '98. International Symposium, May 17–22, 1998, pp. 139–142.

* cited by examiner

Primary Examiner—Alexander S. Thomas
(74) Attorney, Agent, or Firm—Fitzpatrick, Cella, Harper & Scinto

(57) ABSTRACT

A liquid crystal device having a good bend alignment characteristic is provided by using an alignment film having an alignment power of aligning nematic liquid crystal molecules in a bend alignment state under no voltage application and providing a retardation R (nm) of the liquid crystal device under application of a prescribed voltage relative to a refractive index anisotropy Δn of the liquid crystal and a cell thickness d (nm) of the liquid crystal device, providing a retardation factor R/Δn·d of at most 0.3. As a result, the liquid crystal device can be driven at a high speed always in a stable bend alignment state.

12 Claims, 7 Drawing Sheets

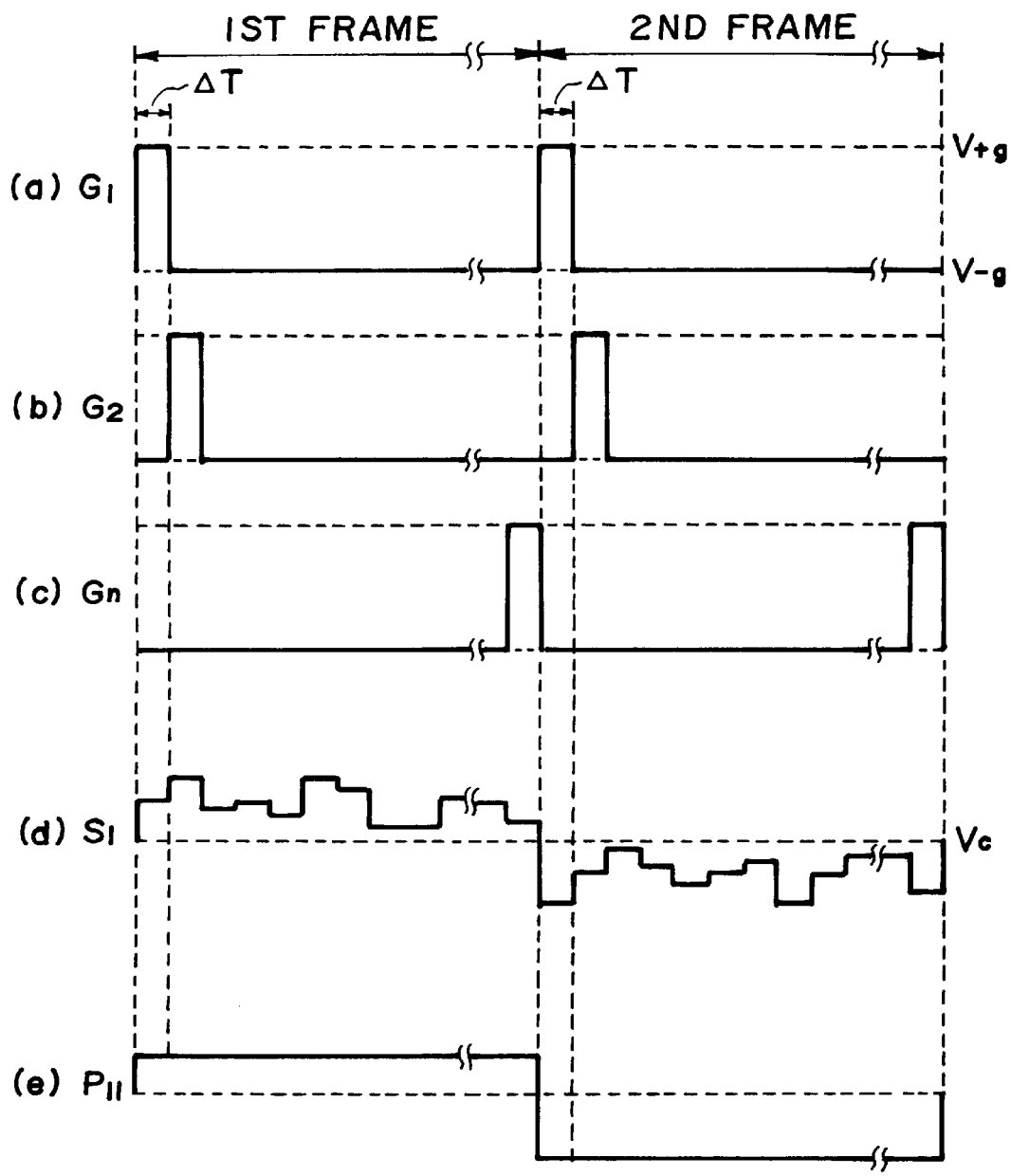
F I G. 5

LIQUID CRYSTAL DEVICE

FIELD OF THE INVENTION AND RELATED ART

The present invention relates to a liquid crystal device used as a display for personal computers, etc.

In recent years, liquid crystal devices have been frequently used, and most of them are TN (twisted nematic)-mode liquid crystal devices using a liquid crystal cell comprising a pair of substrates provided with alignment films having rubbing directions which are deviated from each other by 90 deg. and a nematic liquid crystal disposed between the substrates. There is also known a liquid crystal device wherein a nematic liquid crystal is placed in a splay alignment state between a pair of substrates provided with alignment films having identical rubbing directions. Further, a type of cell (π-cell) wherein the above-mentioned liquid crystal placed in a splay alignment is re-aligned into a bend alignment by applying a voltage thereto so as to provide an improved response speed, was disclosed by U.S. Pat. No. 4,582,396 to P. J. Bos, et al. Further, a system (OCB cell) wherein such a bend alignment cell is combined with phase compensation to provide an improved viewing angle characteristic was disclosed by Miyashita et al., Preprint for L. C. Forum (1993) 2B13.

In such a bend alignment-type nematic liquid crystal device aims at suppressing a back-flow phenomenon in response of liquid crystal to provide improved and high-speed responsiveness, but has involved several problems for its commercialization.

One of such problems is that an electric field treatment is required for transforming the splay alignment into the bend alignment. The splay-bend alignment transformation is not continuous, and a disclination line is present between the two alignment states, so that a process including nucleation and its growth is necessary. In such a process, it is difficult to cause nucleation in all the regions and the control of the nucleation threshold is difficult, so that a high voltage application is required for the electric field treatment. Further, the velocity of growth of the bend alignment regions formed by the nucleation is larger at a higher voltage application, and a time of several seconds to several minutes is required at a low voltage. Another problem is that, in an actual matrix-structured cell, the bend region does not readily grow between pixel electrodes. Several studies have been made regarding manners of voltage application in active matrix-type cells using TFTs (thin film transistors) (e.g., IBM, IDW 1996, p. 133, Initialization of Optically Compensated Bend-mode LCDs", and Japanese Laid-Open Patent Application (JP-A) 9-185032). A further problem is that the bend alignment is restored to splay alignment if the bending voltage is removed, so that a bending treatment is required anew for re-use.

A type of cell (π-cell) having a pretilt angle of 50–51 deg. was disclosed by P. J. Bos, et al., at SID in 1998, as a cell not requiring a bending treatment before use. A bend alignment cell having a large pretilt angle from the initial stage of cell formation was also disclosed by a group of Kogakuin University at Japan 5th Liquid Crystal Forum in 1979 (Preprint, page 166-) and also in JP-A 55-142316.

However, as means for providing such high pretilt angles are very unstable except for oblique evaporation, satisfactory realization has been unsuccessful. Further, at least one time of voltage application has been required after the injection of a liquid crystal into a liquid crystal cell.

SUMMARY OF THE INVENTION

In view of the above-mentioned problems of the prior art, an object of the present invention is to provide a liquid crystal device utilizing a bend alignment, which requires no electric field treatment for transforming splay alignment into bend alignment, no additional bending treatment for re-use, or no holding voltage for bend alignment.

Another object of the present invention is to provide a cell structure capable of providing stable bend alignment, realizing bend alignment from an initial stage after liquid crystal injection, or unnecessitating a bending treatment from splay alignment.

According to the present invention, there is provided a liquid crystal device, comprising: a pair of substrates each having thereon an electrode and an alignment film, and a nematic liquid crystal disposed between the substrates, wherein said alignment film is provided with an alignment power of aligning liquid crystal molecules of the nematic liquid crystal in a bend alignment state under no voltage application and providing a retardation R (nm) of the liquid crystal device under application of a prescribed voltage relative to a refractive index anisotropy $\Delta n$ of the liquid crystal and a cell thickness d (nm) of the liquid crystal device, providing a retardation factor $R/\Delta n \cdot d$ of at most 0.3.

In the liquid crystal device according to the present invention, the liquid crystal can assume a stable bend alignment from an initial stage immediately after the injection of the liquid crystal into the cell, so that it becomes unnecessary to apply an electric field treatment for the bending or a holding voltage for retaining the bend alignment.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5 is a waveform diagram showing a set of drive waveforms for driving a liquid crystal device of FIG. 3.

DESCRIPTION OF THE PREFERRED EMBODIMENTS

Figure 1A:
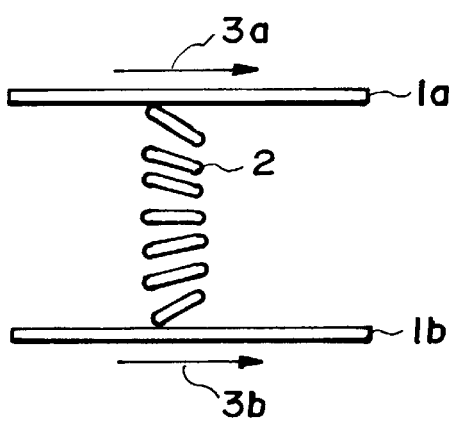
FIGS. 1A–1C are schematic sectional views showing a change in alignment state in a liquid crystal device of the invention.
Figure 1B:
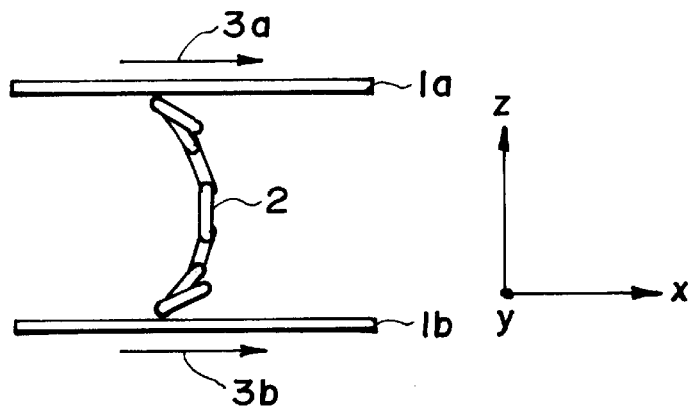
Figure 1C:
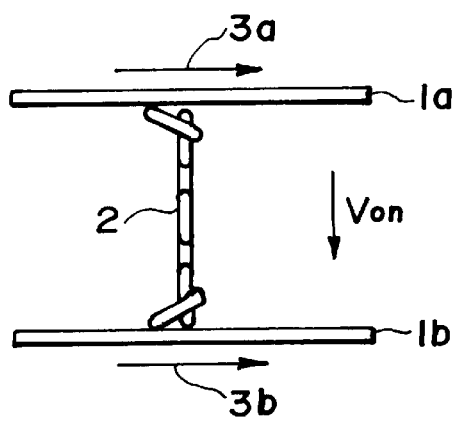

First of all, some alignment states in a liquid crystal device according to the present invention are explained with reference to FIGS. 1A–1C which are schematic views of a section in a direction of normal to the substrates of the liquid crystal device and show a splay alignment state (FIG. 1A), a bend alignment state (FIG. 1B), and a homeotropic alignment state formed by applying a drive voltage $V_{ON}$ to the liquid crystal in the bend alignment state shown in FIG. 1B (FIG. 1C). More specifically, FIGS. 1A–1C illustrate changes in alignment of liquid crystal molecules 2 disposed between a pair of substrates 1a and 1b treated by rubbing in directions 3a and 3b, respectively.

The transition between the states of FIGS. 1B and 1C is much faster than the transition between the states of FIGS. 1A and 1C. Accordingly, a drive between the states of FIGS. 1B and 1C is desirable. In a conventional device, however, the liquid crystal assumes a splay alignment as shown in FIG. 1A in the initial stage, and the application of a bending voltage is required for providing a bend alignment as shown in FIG. 1B. Further, once the bending voltage applied for providing the bend alignment shown in FIG. 1B is removed, the liquid crystal is restored to the splay alignment shown in FIG. 1A, so that it is necessary to apply a holding voltage for retaining the bend alignment during drive, and the bending treatment is required anew before re-use of the liquid crystal device.

In the liquid crystal device according to the present invention, the bend alignment shown in FIG. 1B is attained in the initial stage, i.e., under no electric field. Accordingly, the drive can be started without a bending treatment, and no holding voltage or re-bending treatment is required.

In the liquid crystal device according to the present invention, a gradational display including a halftone display may be performed between the states of FIGS. 1B and 1C. The bend alignment used in the present invention may include a non-twisted bend (hereinafter sometimes abbreviated as "NT-bend") wherein liquid crystal molecular long axes (directors) are disposed in parallel with a plane including a rubbing directions 3a and 3b (or a line dividing an intersection angle formed between the rubbing directions when such intersection occurs) and a normal to the substrates, and a twisted bend (hereinafter, "T-bend") wherein liquid crystal directors 2 are twisted from the above NT-bend alignment to form a slight angle with respect to the above-mentioned plane.

Next, some description will be made regarding the retardation factor or ratio also characterizing the liquid crystal in the liquid crystal device of the present invention.

Conventionally known alignments of a nematic liquid crystal typically induce a planar alignment characterized by a pretilt angle of at most 7 deg., and a homeotropic alignment characterized by a pretilt angle in proximity to 90 deg. It has been reported that oblique evaporation of silicon monoxide results in pillar columns of silicon monoxide at an inclination angle of ca. 40 deg. on a substrate, thereby provide an alignment of liquid crystal molecules at 30–40 deg. However, it has been impossible to align nematic liquid crystal molecules at a substantially high pretilt angle by an alignment technique using an organic film capable of effectively treating a large area. It may be considered possible to stabilize the bend alignment of a liquid crystal by increasing a pretilt angle to lower the elastic energy of the liquid crystal in the bend alignment than in the splay alignment, while it may depend on the properties of the liquid crystal per se, but no method has been developed to realize it. Further, no method has been developed to stabilize the bend alignment by controlling parameters other than the pretilt angle.

The present invention have succeeded in realizing a stable bend alignment from the initial stage of cell preparation by providing a high-pretilt angle cell. A pretilt angle of a liquid crystal in an objective liquid crystal device can be determined by preparing a test liquid crystal device having an organization identical to that of the objective liquid crystal device except for changing the rubbing directions for the pair of substrates into anti-parallel directions, i.e., parallel but mutually opposite directions, and measuring the retardation of the test liquid crystal device by a Berek compensator.

On the other hand, the retardation of the objective liquid crystal device of which the pretilt angle is measured can be measured to determine a retardation factor, from which the pretilt angle and whether the bend alignment is formed or not can be determined. Accordingly, in the present invention, the organization of a liquid crystal device is determined based on the retardation factor. The retardation factor is determined as $R/\Delta n \cdot d$ wherein R denotes a retardation value (nm) as measured by using a Berek compensator in an alignment state established in a liquid crystal device under application of a prescribed voltage (in a sense of including under no voltage), $\Delta n$ denotes a refractive index anisotropy as an inherent property of the liquid crystal used, and d denotes a cell thickness (i.e., liquid crystal layer thickness) in the liquid crystal device.

Figure 7:
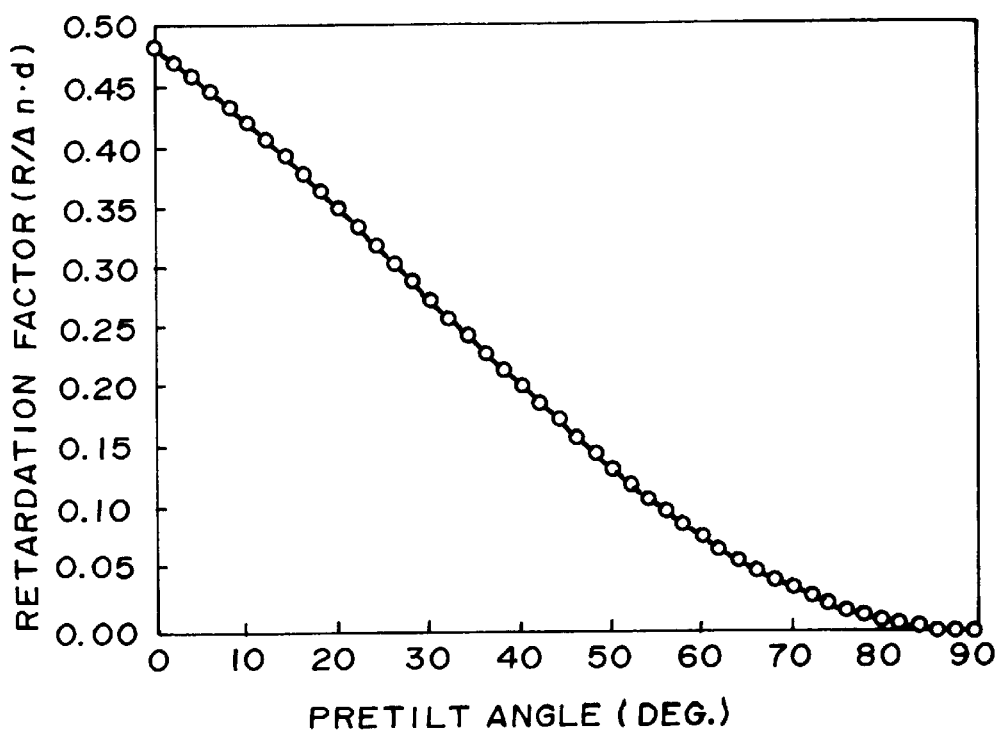
FIG. 7 is a graph showing a relationship between retardation factor and pretilt angle in a liquid crystal device in a bend alignment state.

FIG. 7 shows an example of relationship between retardation and pretilt angle of a fluorine-containing nematic liquid crystal used in the present invention and placed in a bend alignment state. The retardation factor of a liquid crystal device placed in a bend alignment state varies in proximity to the curve shown in FIG. 7 while it is somewhat changed depending on the liquid crystal material used. On the other hand, the retardation factor in a splay alignment state is much larger than represented by the curve shown in FIG. 7. Accordingly, it is possible to assume that a liquid crystal device showing a retardation factor of 0.3 or smaller is placed in a bend alignment while a liquid crystal device showing a larger retardation factor can assume a splay alignment. Further, in the case of a larger retardation factor, a liquid crystal device exhibits only a small pretilt angle even if it is in a bend alignment, so that it cannot assume a bend alignment under no electric field. In the case of a retardation factor of 0.3 or below, a high pretilt angle of at least 25 deg. can be attained for a fluorine-containing nematic liquid crystal, thus allowing a bend alignment as an initial state.

Based on the above finding, according to the present invention, it has become possible to realize a liquid crystal device exhibiting a bend alignment as an initial state by restricting the retardation factor to at most 0.3. In the present invention, the retardation factor may preferably be at least 0.12, so as to provide a pretilt angle of at most 50 deg. More desirably, the retardation factor is set to a value of 0.17–0.27, so as to provide a more stable bend alignment at a pretilt angle of 30–45 deg.

In the liquid crystal device according to the present invention, the above-mentioned high pretilt angle may for example be well realized, e.g., by combining an alignment film component for homeotropically aligning a liquid crystal and an alignment film component for homogeneously aligning a liquid crystal. Further, such an alignment film comprising two types of alignment film components may for example be formed from a mixture of a homeotropic alignment film material and a homogeneous alignment film material. Hereinafter, such an alignment film having two types of alignment film components may be referred to as a composite alignment film.

A preferred class of homeotropic alignment film material constituting the composite alignment film used in the present invention may comprise a compound having a molecular structure including a fluoroalkyl chain. This is presumably because such a compound facilitates an adjustment of the surface state than a compound having an alkyl group as a mere hydrophobic group. In a mixture system, it is considered desirable that a homeotropic alignment film material has a hydrophobic group other than a hydrocarbon group so as to exhibit a better compatibility with a polymer as a homogeneous alignment film material.

A particularly preferred class of homeotropic alignment film material may comprise a polymeric compound having a recurring unit represented by the following formula (I) or (II):

$$-(X)-\!\!\!\!\!\!\!\!\!\!\!\!\!\!\!\overset{\displaystyle -Y-(CH_2)_M-C_NF_{2N+1}}{\phantom{X}} \quad (I)$$

$$-(Z)-\!\!\!\!\!\!\!\!\!\!\!\!\!\!\!\overset{\displaystyle C_NF_{2N+1}}{\underset{\displaystyle C_NF_{2N+1}}{\phantom{Z}}} \quad (II)$$

wherein X and Z each represent polyalkylene chain, polyacrylic acid chain, polymethacrylic acid chain, phthalogenoacrylic acid chain, polyalkylacrylic acid chain, polyoxyalkylene chain, polyimide chain, polyamide chain, polyeter chain, polyfluorinated alkyl chain or polycarbonate chain;

Y non-directionally represents a single bond, $$-O-, \ -COO-, \ -OCOO-, \text{ or } -CON\overset{R_1}{-},$$

$$-(O)_m-(CO)_n-(O)_p-R_2-(N\overset{R_3}{-})_q-(COO)_r-(SO_2)_s-(O)_t-,$$

wherein $R_1$ and $R_2$ independently denote alkyl or hydrogen, $R_2$ denotes alkylene, and m, n, p, q, r, s and t independently denote 0 or 1;

M denotes an integer of 0–20, and

N (suffix) denotes an integer of 0 –30.

Preferred but non-exhaustive examples of the recurring unit may include those represented by the following formulae (1)–(20):

(1) through (11): [chemical structures]

-continued

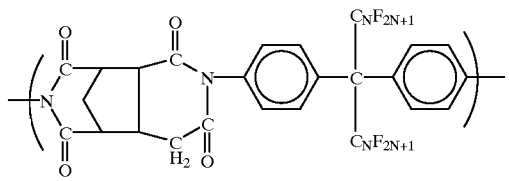
(12)

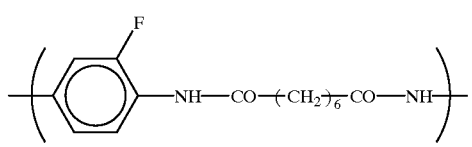
(13)

—(CH₂—CF₂)— (14)

—(CF₂—CF₂)— (15)

—(CF₂—CFH)— (16)

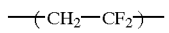
(17)

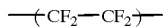
(18)

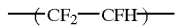
(19)
(Q = 1–10)

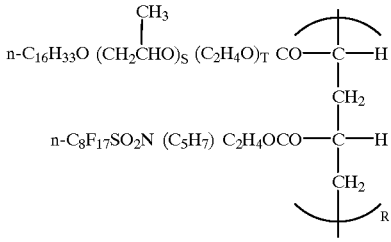
(20)

(S = 2–8, T = 8–42, R = 2–10)

As the homogeneous alignment film material used in mixture with a homeotropic alignment film material as described above, it is possible to use an alignment film material which has been used heretofore for homogeneous alignment of nematic liquid crystals. Examples thereof may include: resins, such as polyvinyl alcohol, polyimide, polyamideimide, polyester, polycarbonate, polyvinyl acetal, polyvinyl chloride, polyvinyl acetal, polyvinyl chloride, polyvinyl acetate, polyamide, polystyrene, cellulosic resin, melamine resin, urea resin and acrylic resin; photosensitive polyimide, photosensitive polyamide, cyclic rubber-based photoresist, phenol novolak-based photoresist, and electron beam photoresist, such as polymethyl methacrylate, and epoxidized 1,4-polybutadiene.

In the present invention, the above-mentioned homeotropic alignment film material and homogeneous alignment film material may be mixed each other in an appropriate ratio so as to provide a preferred range of high pretilt angle.

In the present invention, it is preferred that a pair of substrates are each provided with an alignment film capable of providing a high pretilt angle, such as a composite alignment film as described above, and rubbed in one direction, and are superposed and applied to each other so that their rubbed directions are substantially parallel to each other to provide a liquid crystal device.

In the liquid crystal device according to the present invention, each alignment film may preferably have a surface every of at most 42.1 dyne/cm, more preferably 37.4–40.9 dyne/cm, so as to provide a stable bend alignment. An alignment film having such a surface energy is effective for aligning a fluorine-containing nematic liquid crystal at a high pretilt angle but is not so effective for aligning a cyano-based or pyrimidine-based nematic liquid crystal as it can provide a high pretilt angle, if at all possible, only in a very narrow surface energy range.

The surface energy referred to herein is based on values measured in the following manner by using a contact angle measurement apparatus ("Model CA-DT", available from Kyowa Kaimen Kagaku K. K.).

For a surface energy measurement in general, a sample film (layer) is formed on a glass substrate and drops of α-bromonaphthalene, methylene iodide and pure water are dripped on the film to measure contact angles θ1, θ2 and θ3, respectively, with the sample film. The measured values of θ1, θ2 and θ3 are substituted into the following formulae to calculate a dispersion term $\gamma_s^d$, a polarity term $\gamma_s^p$ and a hydrogen bond term $\gamma_p^h$, respectively, of the surface energy of the film.

$$\sqrt{\gamma_s^d} = \frac{1}{2}\sqrt{44.6}(1 + \cos\theta_1)$$

$$\sqrt{\gamma_s^p} = \frac{(46.8 + 4.0)(1 + \cos\theta_2) - 2\sqrt{46.8}\sqrt{\gamma_s^d}}{2\sqrt{4.0}}$$

$$\sqrt{\gamma_s^h} = \frac{(29.1 + 1.3 + 42.4)(1 + \cos\theta_3) - 2\sqrt{29.1}\sqrt{\gamma_s^d} - 2\sqrt{1.3}\sqrt{\gamma_s^p}}{2\sqrt{42.4}}$$

wherein 44.6 is a surface energy of α-bromo-naphthalene; 46.8, a dispersion term of surface energy of methylene iodide; 4.0, a polarity term of surface energy of methylene iodide; 29.1, a dispersion term of surface energy of pure energy; 1.3, a polarity term of surface energy of pure water; and 44.2, a hydrogen bond term of surface energy of pure water.

Then, a surface energy γ is calculated as a total of the above-mentioned terms, i.e., $\gamma = \gamma_s^d + \gamma_s^p + \gamma_2^h$.

Herein, the term fluorine-containing nematic liquid crystal refers to a nematic liquid crystal material comprising a mesomorphic compound containing a fluorine atom in its molecular structure, e.g., as a polar group containing a fluorine atom in its core or tail portion, or a composition containing such a fluorine-containing mesomorphic compound. Herein, the mesomorphic compound includes both a liquid crystal compound showing a nematic phase by itself, and a latent liquid crystal compound not showing a nematic phase by itself but providing a nematic liquid crystal composition showing a nematic phase when mixed with other mesomorphic compounds. The fluorine-containing nematic liquid crystal may preferably exhibit a volume resistivity of at least $3\times10^{13}$ ohm.cm.

In the present invention, it is preferred to use a fluorine-containing nematic liquid crystal exhibiting an elastic constant $K_{33}$ for bend alignment and an elastic constant $K_{22}$ for twist alignment giving a ratio $K_{33}/K_{22}$ of at most 4.2 so as to provide a larger region of the above-mentioned NT-bend alignment. Further, a ratio $K_{33}/K_{22}$ of 2.08 or below is further preferred because the NF-bend alignment can be uniformized over the entire area. This is because, compared with the NT-bend alignment wherein liquid crystal molecules are aligned in parallel with a plane including a normal to the substrates and an average rubbing direction, the T-bend alignment including a twist of liquid crystal molecules, even if it is small, from the plane, provides a contrast lowered by contribution of the twist.

Figure 2A:
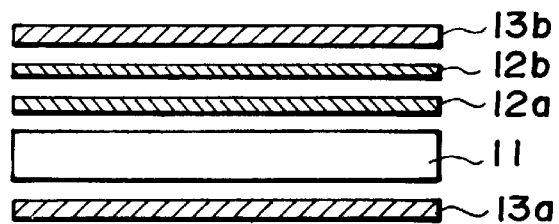
FIG. 2A illustrates a stacked structure of a display device including a liquid crystal device of the invention, phase compensation plates and polarizers.
Figure 2B:
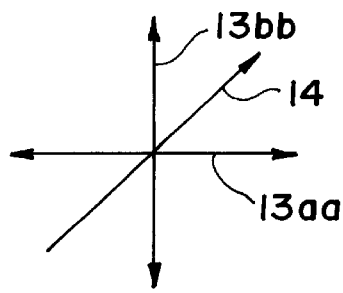
FIG. 2B illustrates a relationship between the rubbing direction and polarization axes.

When a liquid crystal device 11 according to the present invention is used as a transmission device, as shown in FIG. 2A, a pair of polarizers 13a and 13b are disposed outside the liquid crystal device 11. In this instance, the polarization axes 13aa and 13bb of the polarizers 13a and 13b, respectively, are disposed as shown in FIG. 2B so as to form an angle of 45 deg. each from a rubbing direction 14 provided to the pair of substrates (which represents an average of rubbing direction when rubbing directions of the substrates intersect each other at some angle). In case where the liquid crystal device is used to form a reflection device, the polarizer 13a disposed on an opposite side as viewed from a viewer can be omitted.

In the liquid crystal device according to the present invention, it is preferred to dispose a uniaxial phase compensation plate 12a (formed by laminating a plurality of retardation films) having a positive retardation so as to compensate for a retardation of light passing through the liquid crystal layer at a prescribed voltage, thereby effecting an optical compensation of black display at that voltage. Further, as the liquid crystal molecules at a central portion of the liquid crystal layer are rich in components normal to the substrates and are liable to impair the viewing angle characteristic under voltage application, it is also preferred to insert a phase compensation plate 12b having a negative retardation (R<0) of relatively reducing the component of Z-direction shown in FIG. 1B, thereby reducing a retardation difference between a component perpendicular to and a component parallel to the substrates in the liquid crystal layer, thereby improving the viewing angle characteristic. Alternatively, instead of using the phase compensation plates 12a and 12b, it is also possible to use a biaxial phase compensation plate having the functions of these in combination.

In the present invention, if a cell structure is designed so as to reduce the retardation of the liquid crystal device in the dark state to at most 50 nm, the above-mentioned phase compensation plate 12a can be omitted.

More specifically, the contrast is determined only by the retardation of the liquid crystal layer, a transmittance T (%) as viewed from a frontal position is proportional to $\sin^2(R\pi/\lambda)$, wherein R denotes a retardation (nm) of the liquid crystal layer, and $\lambda$ denotes an incident light wavelength (nm).

For convenience of evaluating a practical performance, $\lambda$ may be taken at 550 nm to which human eyes are most sensitive. Then, T (%) becomes proportional to $\sin^2(R\pi/550)$.

Figure 6:
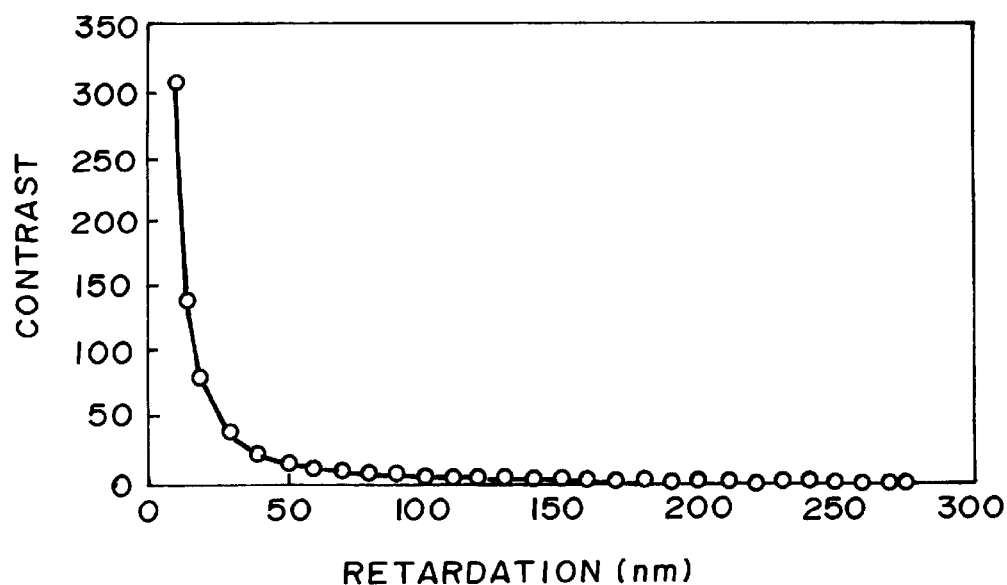
FIG. 6 is a graph showing a change of contrast depending on retardation of a liquid crystal device in the dark state for a constant retardation in the bright state.

As a result, a maximum transmittance corresponding to a bright state is given at R=275 nm (=550/2). Accordingly, in order to provide a sufficient contrast, a smaller retardation in the dark state is preferred. FIG. 6 shows the dependence of contrast on the change in retardation in the dark state in case where the retardation in the bright state is 275 nm (=R). According to FIG. 6, it is shown that the contrast is remarkably increased if the retardation in the dark state is suppressed to 50 nm or below. Accordingly, if the retardation in the dark state is at most 50 nm, a practical contrast of at least 10 acceptable for an ordinary display can be obtained without using a phase compensation plate 12a.

Figure 3:
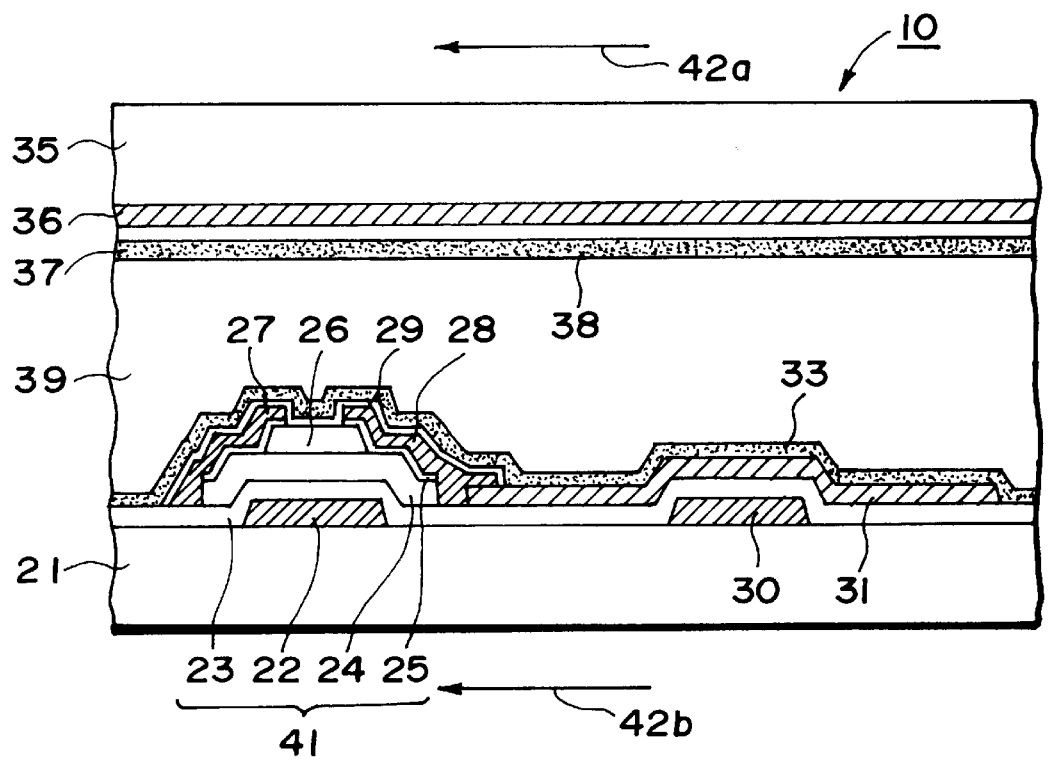
FIG. 3 is a schematic sectional view for one pixel of a liquid crystal device according to an embodiment of the invention.
Figure 4:
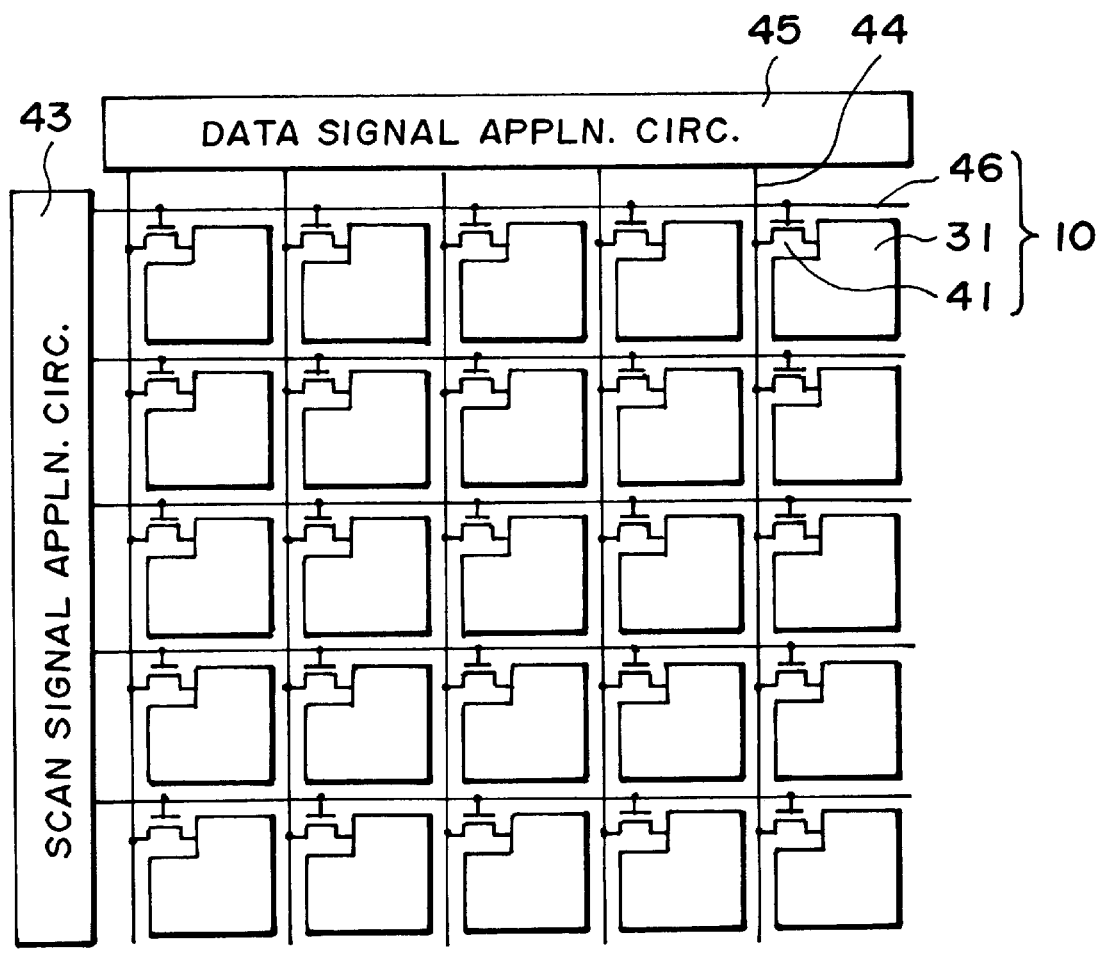
FIG. 4 is a schematic plan view of a display panel including a liquid crystal device of the invention and drive circuits therefor.

FIG. 3 shows a sectional view of one pixel of an embodiment of the liquid crystal device according to the present invention, and FIG. 4 is a schematic plan view of a display panel including the liquid crystal device. The liquid crystal device is an active matrix-type liquid crystal device 10 using TFTs (thin film transistors) as switching elements (devices). As shown in FIG. 4, the liquid crystal device 10 includes a plurality of pixel electrodes 31 arranged in the form of a matrix, and each pixel electrode 31 is provided with a TFT 41, of which a gate electrode is connected to a scanning signal line 46 and a source electrode is connected to a data signal line 44 so as to form a wiring matrix. The respective scanning signal lines 46 are sequentially supplied with a scanning selection signal (ON signal for TFTs 41 on a selected line) from a scanning signal application circuit 43, and in synchronism with the scanning selection signal, the respective data signal lines 44 are supplied with data signals carrying prescribed gradation data from a data signal application circuit 45 to supply the data signals to the pixel electrodes 31 on the selected line, thereby writing in the liquid crystal at the respective pixels to provide prescribed display states.

Referring to FIG. 3 for describing a sectional structure, each pixel of the liquid crystal device 10 comprises a substrate 21, a TFT 41 disposed on the substrate 21 and comprising a gate electrode 22, a gate insulating film 23, a semiconductor layer 24, an ohmic contact layer 25, an insulating layer 26, a source electrode 27, a drain electrode 28 and a passivation film 29, a pixel electrode 31 connected to the drain electrode 28, a retention capacitor electrode 30, an alignment film 33 disposed over the above-mentioned members on the substrate 21, a counter substrate 35 having thereon a common electrode 36, an insulating layer 37 and an alignment film 38, and a liquid crystal disposed between the alignment films 33 and 38 which have been rubbed in directions 42b and 42a, respectively.

Referring to FIG. 3, in the case of a transmission-type liquid crystal device, the substrate 21 is a transparent one comprising ordinarily glass or plastic, and in the case of a reflection-type device the substrate 21 can be an opaque substrate comprising, e.g., silicon, in some cases. The pixel electrodes 31 and the common electrode 36 comprise a transparent conductor, such as ITO (indium tin oxide) in the case of a transmission type but the pixel electrodes 31 can comprise a metal having a high reflectivity so that also functions as a reflector in the case of a reflection type. The semiconductor layer 24 may generally comprise amorphous (a-)Si which may for example be formed in a thickness of ca. 200 nm on a glass substrate heated at ca. 300° C. by glow discharge decomposition (plasma CVD) of mono-silane ($SiH_4$) diluted with hydrogen. Alternatively, it is also possible to preferably use polycrystalline (p-)Si. The ohmic contact layer 25 may for example be formed by doping an $n^+$a-Si layer with phosphorus. The gate insulating film 23 may comprise silicon nitride ($SiN_x$), etc., as formed by glow discharge decomposition. Further, the gate electrode 22, source electrode 27, drain electrode 28, retention capacitor electrode 30, and lead conductors, may generally comprise a metal, such as Al. As for the retention capacitor electrode 30, it can some times comprise a transparent conductor, such as ITO. The insulating layer 37 may comprise $Ta_2O_5$, etc., and the insulating layer 26 and the passivation layer 29 may preferably comprise an insulating film of, e.g., silicon nitride.

FIG. 5 shows an example set of drive signal waveforms for driving the above-mentioned embodiment of liquid crystal device. Referring to FIG. 5, at (a)–(c) are shown scanning signal waveforms applied to first, second and n-th (final) scanning signal lines, respectively. At (d) is shown a data signal waveform applied to a first data signal waveform applied to a pixel on a first row and a first column as a result of application of the scanning signal waveform at (a) and the data signal waveform at (d).

The liquid crystal device of this embodiment can be driven by a lower side drive voltage of 0 volt but can be driven at a higher speed by applying a certain value of lower side driven voltage.

In the liquid crystal device according to the present invention, a specific nematic liquid crystal may be used to provide a specific retardation factor, thereby forming a bend alignment under no voltage application. Other structural members, and materials, shapes, sizes and production processes are not particularly limited, and known techniques for conventional liquid crystal devices can be applied.

EXAMPLES

Hereinbelow, the present invention will be described more specifically based on Examples. In the following examples, the values of retardation factors were measured by using a Berek compensator for objective liquid crystal devices. On the other hand, the values of pretilt angle were measured by preparing test liquid crystal devices of anti-parallel rubbing directions otherwise similar to the objective liquid crystal device and using a Berek compensator for measuring the retardation values of the test liquid crystal devices.

Example 1

A TFT-driven liquid crystal device having a planar size of 230 nm×180 nm and a sectional structure as shown in FIG. 3 was prepared. The TFT substrate structure was prepared according to a known TFT production technique, and the semiconductor layer 24 of a TFT 41 was formed of a-Si.

In this example, the alignment films 33 and 38 were formed as composite alignment films of various compositions obtained by mixing a homeotropic alignment film material of the above-mentioned example formula (20) (Resin A) and a polyimide-type homogeneous alignment film material (Resin B) having a recurring unit represented by the following formula so as to provide contents of resin A in a range of 1–8 wt. %.

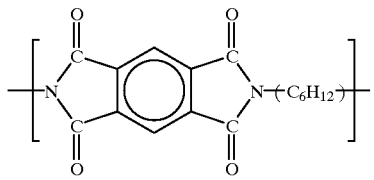

For a fluorine-containing nematic liquid crystal (e.g., "KN-5030" available from Chisso K.K. used hereinafter in this example), Resin A was found to homeotropically aligning liquid crystal molecules whereas Resin B realized homogeneous alignment. Resin B alone provided a pretilt angle of below 5 deg. Mixture of Resins A and B containing 1–8 wt. % of Resin A were found to realize a bend alignment, including one of a Resin A content of 5 wt. % providing a retardation factor of 0.27 and a pretilt angle of 30 deg. In this example, a Resin A content of below 1 wt. %, resulted in a homogeneous alignment of liquid crystal over the entire area, and a Resin A content over 8 wt. % resulted in homeotropic alignment of liquid crystal over the entire area.

In this example, a 40 nm-thick composite film of Resin A and Resin B was formed by mixing respective precursor solutions and applying the resultant mixture solution onto a substrate, followed by baking. Resin B before the mixing and baking was dissolved in a solvent principally comprising NMP (N-methylpyrrolidone), and Resin A before the mixing and baking was dissolved in a solvent principally comprising IPA (isopropyl alcohol). Resin A and Resin B did not exhibit a good mutual mixability so that the mixture precursor solutions of these resins were well stirred before application and then applied onto a substrated heated to ca. 100° C. in advance, and then the coating was baked at 200° C. for 60 min.

The thus-applied alignment film was rubbed by using a rubbing roller comprising a 80 mm-dia. roller about which a cotton yarn-planted cloth was wound under the conditions of a rotation speed of 1000 rpm, a cotton yarn-pressed tip length of 0.3 mm pressed against the substrate, and a substrate feed speed of 50 mm/sec.

A pair of substrates each having a rubbed alignment film thus provided were superposed opposite to each other so that their rubbing directions were parallel to each other, and applied to each other via 6 $\mu$m-dia. spacer beads to form a blank cell, into which a fluorine-containing nematic liquid crystal exhibiting no cholesteric phase ("KN-5030", available from Chisso K.K. volume resistivity $(V_R)$=1.2×10$^{14}$ ohm·cm) was injected to provide a liquid crystal device.

Figure 8A:
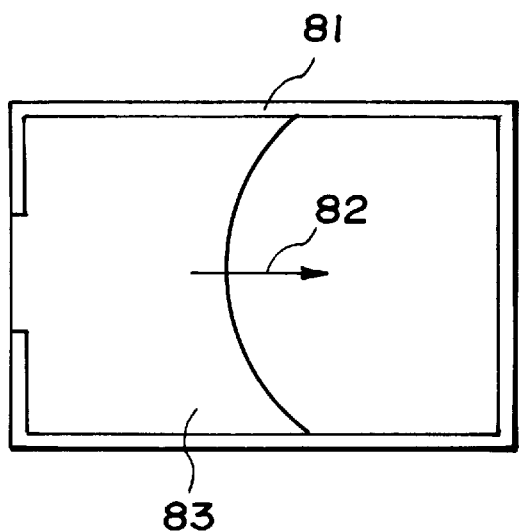
FIGS. 8A and 8B illustrate a development of a bend alignment after liquid crystal injection in a liquid crystal device of the invention.
Figure 8B:
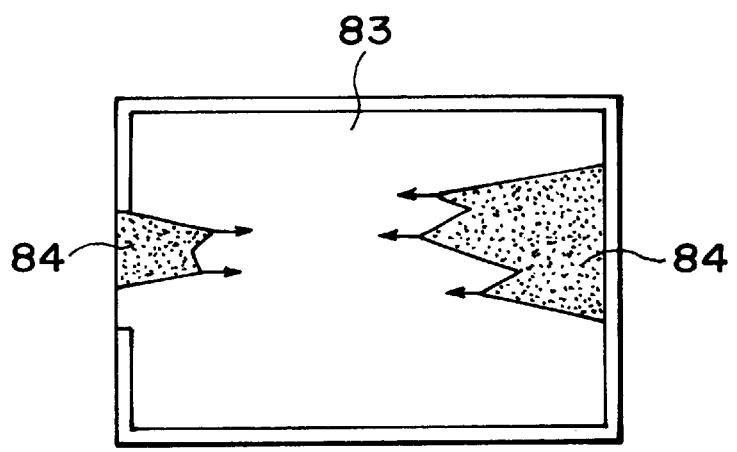

The manner of liquid crystal injection and development of alignment state in this example are illustrated in FIGS. 8A and 8B. As shown in FIG. 8A, the liquid crystal was injected into the cell 81 and moved in a direction 81 while forming a splay alignment region 83 due to the influence of liquid crystal flow. However, upon completion of the injection, regions 84 of bend alignment were generated and developed from a portion adjacent to the innermost wall and a portion close to the injection port as shown in FIG. 8B to be propagated over the entire area. Further, in some cases, some splay alignment region was left but was readily removed by drive voltage application to provide a bend alignment over the entire area, because the liquid crystal device in this example was set so that the bend alignment was stabler than the splay alignment.

As shown in FIG. 2A, outside a liquid crystal device 11 thus prepared with a composite alignment film of Resin A content of 5 wt. %, a phase compensation plate 12 having a retardation of 36 nm for optical compensation of black display in normally white display was disposed, and a phase compensation plate 12b having a negative retardation was further disposed so as to improve the viewing angle characteristic. More specifically, the phase compensation plate 12b was set so as to provide an index ellipsoid giving a refractive index $n_z'$ in a direction normal to the substrate and refractive index $n_x'$ perpendicular to the $n_z'$ direction (with a refractive index $n_y'$ (=$n_x'$) in the direction perpendicular to both the $n_z'$ and $n_x'$ directions) satisfying $n_z'$=$n_x$ and $n_x'$=$n_z$ with respect to light having passed through the liquid crystal device and the phase compensation plate 12a and exhibiting an index ellipsoid including a refractive index $n_z$ in a direction normal to the substrates and a refractive index $n_x$ in a direction perpendicular to the $n_z$ direction (with a refractive index $n_y$ (=$n_x$) in the direction perpendicular to both the $n_x$ and $n_z$ directions). Further, cross nicol polarizers 13a and 13b were further disposed so as to provide a liquid crystal display device of a normally white display type.

The thus-prepared liquid crystal display device was driven according to a normally white display mode by applying waveforms shown in FIG. 5 wherein the parameters were set to $V_{+g}=10$ volts, $V_{-g}=-10$ volts, gate selection period $\Delta T=16$ $\mu$sec., data signal voltage=$\pm1.9$ volts to $\pm6.6$ volts during display and a black display at $\pm6.6$ volts. Incidentally, in this example, a lower side voltage was set to $\pm1.9$ volts so as to increase the response speed while the device could be driven at a lower side data signal voltage of 0 volt. The common electrode was set at a reference potential. Under these conditions, the response times $\tau_{on}$ and $\tau_{off}$ were measured as time periods of 90% transmittance change from a lower voltage state to a higher voltage state and 90% transmittance change from a higher voltage state to a lower voltage state, respectively. As a result, $\tau_{on}$ (causing a transmittance change of from 100% to 10%) was 0.36 msec, and $\tau_{off}$ (causing a transmittance change of from 0% to 90%) was 4.72 msec., in this example, as measured at room temperatures (similarly as in other Examples).

Example 2

Liquid crystal devices were prepared by using Resin C formed from a monomer of the formula:

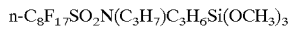

n-C$_8$F$_{17}$SO$_2$N(C$_3$H$_7$)C$_3$H$_6$Si(OCH$_3$)$_3$ as a homeotropic alignment film material instead of Resin A and in combination with Resin B as a homogeneous alignment film material used in Example 1, otherwise in similar manners as in Example 1.

An alignment film of Resin C alone exhibited a contact angle with a-bromonaphthalene of 73.7 deg., a contact angle with methylene iodide of 94.3 deg. and a contact angle with water of 107.4 deg., thus exhibiting a surface energy of 35.6 dyne/cm, and resulted in homeotropic alignment of a fluorine-containing nematic liquid crystal.

Composite alignment films were formed by mixing a solution of the monomer for Resin C and a solution of Resin B precursor (polyamic acid) in a solvent comprising principally NMP in various ratios so as to provide Resin C contents in a range of 1–10 wt. %. Each mixture solution was well stirred and applied onto a substrate heated to 100° C. in advance and baked at 200° C. for 60 min. Then, each composite alignment film was rubbed in the same manner as in Example 1.

In this example, the Resin C content of the above-mentioned range provided a stable bend alignment as an initial state. A liquid crystal device including a composite alignment film having a Resin C content of 5 wt. % exhibited a retardation factor of 0.2 and a pretilt angle of 40 deg.

Outside the liquid crystal device, a phase compensation plate 12$a$ having a retardation of 41 nm, a phase compensation plate 12$b$ having a negative retardation, and a pair of cross nicol polarizers 13$a$ and 13$b$ were disposed to provide a liquid crystal display device as shown in FIG. 2. The liquid crystal display device was found to provide a bend alignment as an initial state without application of a bending voltage and could be successfully driven similarly as in Example 1.

Incidentally, Resin D formed from the following monomer was found to function similarly as Resin C used in this example:

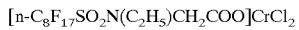

[n-C$_8$F$_{17}$SO$_2$N(C$_2$H$_5$)CH$_2$COO]CrCl$_2$

Example 3

Figure 9:
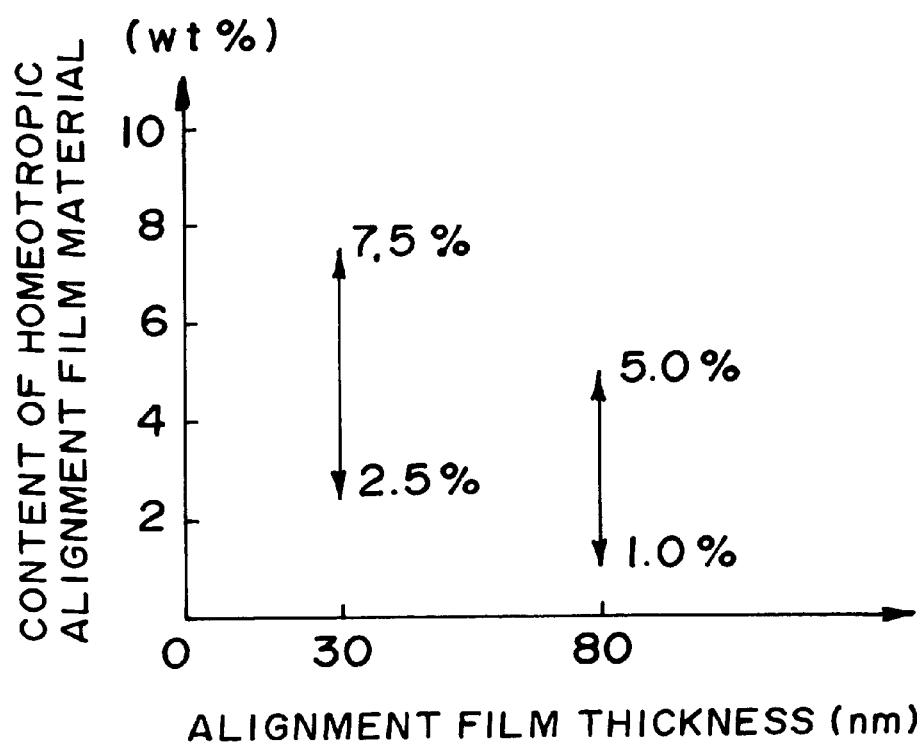
FIG. 9 is a graph showing a change in appropriate content of homeotropic alignment film material in a composite alignment film depending on the thickness of the composite alignment film.

Various composite alignment films and liquid crystal devices including the alignment films were formed by using Resin E ("SE-1211", available from Nissan Kagaku K.K.) as a homeotropic alignment film material and Resin F (polyimide-type "AL0656", available from Nippon Gosei Gomu K.K.) as a homogeneous alignment film material so as to provide composite alignment films having various thicknesses and homeotropic alignment film material contents in the range of 1–10 wt. %. As a result, the appropriate homeotropic alignment film material contents for providing a stable bend alignment as an initial state varied as shown in a graph of FIG. 9. Thus, as shown in FIG. 9, a stable bend alignment was attained in a Resin E content range of 2.5–7.5 wt. % at an alignment film thickness of 30 nm and in a Resin E content range of 1–5 wt. % at an alignment film thickness of 80 nm.

Further, a liquid crystal device using alignment films having a thickness of 30 nm and a Resin E content of 5 wt. % exhibited a retardation factor of 0.22 and a pretilt angle of 36 deg., and a liquid crystal device using alignment films having a thickness of 30 nm and a Resin E content of 7 wt. % exhibited a retardation factor of 0.17 and a pretilt angle of 45 deg.

For a liquid crystal device 11 using alignment films having a thickness of 30 nm and a Resin E content of 6 wt. %, a phase compensation plate 12$a$ having a retardation of 50 nm for optically compensating for black display, a phase compensation plate 12$b$ having a negative retardation, and a pair of cross nicol polarizers 13$a$ an 13$b$ were disposed outside as shown in FIG. 2 to provide a liquid crystal display device similarly as in Example 1.

The thus-prepared liquid crystal display device was driven according to a normally white display mode by applying drive waveforms shown in FIG. 5 wherein the parameters were set to $V_{+g}=10$ volts, $V_{-g}=-10$ volts, $\Delta T=16$ $\mu$sec., data signal voltages=0.0 volt to $\pm15.0$ volts during display and a common electrode potential set at a reference potential, while applying a DC voltage in one frame. The liquid crystal device of this example exhibit a response time $\tau_{on}$ (causing a transmittance change of 100% to 10% at a voltage change of 0 volt to $\pm5.0$ volts) of 0.76 msec and $\tau_{off}$ (causing a transmittance change of 0% to 90% at a voltage change of $\pm5.0$ volts to 0 volt) of 9.9 msec.

For comparison, a liquid crystal device was prepared in the same manner as above except for replacing the composite alignment film with an alignment film of Resin F alone (giving a pretilt angle of 6 deg.). The liquid crystal device exhibited a splay alignment as an initial state, so that it was supplied with 7 volts as a bending alignment treatment. Thereafter, the device was driven according to a normally white display mode by applying drive waveforms shown in FIG. 5 wherein the parameters were set to $V_{+g}=10$ volts, $V_{-g}=-10$ volts, $\Delta T=16$ $\mu$sec., data signal voltages=$\pm2.0$ volts to $\pm5.2$ volts during display and a common electrodepotential set at a reference potential. The liquid crystal device of this example exhibited a response time $\tau_{on}$ (causing a transmittance change of 100% to 10% at a voltage change of $\pm2.0$ volts to $\pm5.0$ volts) of 1.36 msec and $\tau_{off}$ (causing a transmittance change of 0% to 90% at a voltage change of $\pm5.0$ volts to $\pm2.0$ volts) of 15.08 msec. In comparison with these results, the liquid crystal device of this Example (showing $\tau_{on}=0.76$ msec and $\tau_{off}=9.9$ msec) was found to exhibit a remarkably better responsiveness.

Example 4

Various liquid crystal devices were prepared by using 30 nm-thick and 80 nm-thick different composite alignment films formed by mixing Resin E and Resin F in varying ratios and using either the same fluorine-containing nematic liquid crystal or a non-flourine containing pyrimidine-based nematic liquid crystal ("KN-5027", available from Chisso K.K.). The other structures were identical to those adopted in Example 3.

Particulars of the alignment films and the initial states of the respective liquid crystal devices are summarized in Table 1 below.

TABLE 1

| Alignment film | | | Initial alignment state of nematic liquid crystal | |
|---|---|---|---|---|
| Resin E content | | Surface | | |
| 80 nm (wt. %) | 30 nm (wt. %) | energy (dyne/cm) | fluorine* | non-fluorine |
| 7.5 | >11.0 | <37.0 | C | homeotropic |
| — | 11.0 | 37.3 | B | " |
| — | 7.5 | 37.4 | A | " |
| — | 5.0 | 37.8 | A | " |
| — | 2.5 | 38.7 | A | " |
| 5.0 | — | 39.2 | A | homogeneous |
| 1.0 | — | 40.9 | A | " |
| — | 1.0 | 42.1 | B | " |
| — | <0.9 | >42.5 | C | " |

*A: Bend alignment over at least 90% area.
B: Bend alignment over at least 60–90% area.
C: Bend alignment over at least 40–60% area.

As shown in Table 1 above, a stable bend alignment was established in a surface energy range of 37.7–42.1 dyne/cm, particularly over substantially the entire area in a surface energy range of 37.4–40.9 dyne/cm. Incidentally, a liquid crystal device having a 80 nm-thick alignment films containing 3 wt. % of Resin E exhibited a retardation factor of 0.22 and a pretilt angle of 36 deg.

Among the above, a liquid crystal device including 80 nm-thick alignment films containing 3 wt. % of Resin E was formulated into a display device including a phase compensation plate 12a having a positive retardation of 145 nm for black display at 0.0 volt and a pair of cross nicol polarizers for normally black display otherwise in a similar manner as in Example 1. The device was driven according to a normally black display mode by applying drive waveforms shown in FIG. 5 wherein the parameters were set to $V_{+g}=10$ volts, $V_{-g}=-10$ volts, $\Delta T=16$ μsec, data signal voltages=0.0 V to ±5.3 volts during display, and a common electrode potential set to a reference potential. As a result, a flicker-free high-contrast display could be performed according to a normally black mode by using a liquid crystal display device wherein bend alignment was stable under no electric field and therefore no attenuation of pixel voltage occurred during the frame period. The liquid crystal device exhibited a response time $\tau_{on}$ (causing a transmittance change of 0–90% in response to a voltage change of 0 volt to ±5.3 volts) of 0.76 msec and $\tau_{off}$ (causing a transmittance change of 100% to 10% in response to a voltage change of ±5.3 volts to 0 volt) of 9.9 msec.

The transmittance at white display is affected by difference between retardations at applied voltages of 0 volt and ±5.3 volts. The optimization of retardation values in view of this factor may be performed (1) by increasing the cell thickness or (2) by using a liquid crystal having a larger value of Δn, such as a pyrimidine-base liquid crystal (which may have a larger Δn of 0.16 compared with Δn=0.13 of the liquid crystal used in this example).

Example 5

Liquid crystals having various elastic constants $K_{11}$ (for spreading or splaying), $K_{22}$ (for twisting), $K_{33}$ (for bending) and ratio $K_{33}/K_{22}$, were provided and the initial alignment states thereof were evaluated. More specifically, fluorine-containing nematic liquid crystals provided herein included: "RDP-50892" ($V_R=9\times10^{13}$ ohm·cm) and "RDP-30864" ($V_R=9\times10^{13}$ ohm·cm) available from Rodic Co., "KN-5028" ($V_R=1.1\times10^{14}$ ohm·cm) and "KN-5031" ($V_R=1.3\times10^{14}$ ohm·cm) available from Chisso K.K., and mixture liquid crystals LC-1 to LC-3 of which elastic constant ratios were adjusted. These liquid crystals were free from chiral components and were found to have elastic constants shown in the following Table 2 as measured according to methods described at page 216, et. seq. of "Ekisho: Kisohen (Liquid Crystals: Basics)" (in Japanese) published from Baihuukan K.K. (Jul. 15, 1985).

TABLE 2

| | $K_{11}$ | $K_{22}$ | $K_{33}$ | $K_{33}/K_{22}$ |
|---|---|---|---|---|
| LC-1 | 12.7 | 4.3 | 19.5 | 4.53 |
| LC-2 | 12.3 | 4.3 | 19.0 | 4.42 |
| RDP-30864 | 15.3 | 4.6 | 20.0 | 4.35 |
| RDP-50892 | 11.3 | 4.3 | 17.7 | 4.12 |
| LC-3 | 10.2 | 4.8 | 18.0 | 3.75 |
| KN-5028 | 9.6 | 6.1 | 12.7 | 2.08 |
| KN-5031 | 11.1 | 7.6 | 15.9 | 2.07 |

Liquid crystal devices were prepared by using the above liquid crystals in combination with a 30 nm-thick composite alignment film comprising Resin E and Resin F (as used in Example 3) at a Resin E content of 5 wt. % and a 30 nm-thick alignment film of Resin F alone with other organizations identical to those in Example 3, and the alignment states therein were evaluated under application of 0 volt and 2.0 volts, respectively. A liquid crystal device using the composite alignment film exhibited a retardation factor of 0.22 and a pretilt angle of 36 deg., and a liquid crystal device using the alignment film of Resin F alone exhibited a retardation factor of 1.0 and a pretilt angle of 6 deg., when used in combination with a fluorine-containing nematic liquid crystal as described above. The results of evaluation of the alignment states are shown in Table 3 below.

TABLE 3

| | | Alignment film | | |
|---|---|---|---|---|
| | | Composite (Resin E + F) | | Resin F alone |
| Applied voltage (volts) | | 0.0 | 2.0 | 0.0 | 2.0 |
| (Liquid Crystals) ($K_{33}/K_{22}$) | | | | | |
| LC-1 | 4.53 | C | A | D | A |
| LC-2 | 4.42 | C | A | D | A |
| RDP-30864 | 4.35 | C | A | D | A |
| RDP-508932 | 4.12 | B | A | D | A |
| LC-3 | 3.75 | B | A | D | A |
| KN-5028 | 2.08 | A | A | D | A |
| KN-5031 | 2.07 | A | A | D | A |

A: NT-bend alignment over the entire area.
B: NT-bend alignment in a major region, and T-bend alignment in a minor region.
C: NT-bend alignment in a minor region, and T-bend alignment in a major region.
D: Splay alignment over the entire area.

As shown in Table 3, all the liquid crystal devices using the alignment film of Resin F alone failed to exhibit bend alignment but exhibited splay alignment. In these cases, it was necessary to intermittently apply a voltage of 5.0 volts or high in order to convert the splay alignment into bend alignment, and continually apply a voltage of ca. 2.0 volts in order to retain the bend alignment state.

On the other hand, in the liquid crystal devices using the composite alignment film, bend alignment was stable than splay alignment even under no voltage application except for the case of using liquid crystals showing an elastic constant ratio $K_{33}/K_{22}$ exceeding 4.12. Moreover, in the liquid crystal devices using liquid crystals showing an elastic constant ratio of 2.08 or less, NT-bend alignment providing a high contrast was developed over the entire area, thus showing that a high contrast liquid crystal device could be obtained by using a liquid crystal showing such a low elastic constant ratio.

As described above, according to the present invention, there is provided a liquid crystal device in which a stable bend alignment is formed as an initial state so that it becomes unnecessary to apply a bend aligning treatment, such as voltage application and also a re-bending aligning treatment before reuse of the liquid crystal device, and further the application of a holding voltage during drive becomes unnecessary. Accordingly, it is possible to provide a liquid crystal device allowing stable high-speed drive always in a bend alignment, thereby showing excellent display characteristics and high reliability.

What is claimed is:

1. A liquid crystal device, comprising:
   a pair of substrates each having thereon an electrode and a composite alignment film comprising a polymeric component for homeotropically aligning a liquid crystal and a polymeric component for homogenously aligning a liquid crystal, and
   a fluorine-containing nematic liquid crystal disposed between the substrates, wherein
   said composite alignment film aligns liquid crystal molecules of the nematic liquid crystal in a bend alignment state without any voltage application and provides a retardation R (nm) of the liquid crystal device under application of a prescribed voltage relative to a refractive index anisotropy Δn of the liquid crystal and a cell thickness d (nm) of the liquid crystal device, providing a retardation factor R/Δn·d of at most 0.3.

2. A liquid crystal device according to claim 1, wherein said alignment film comprises a mixture of a homeotropic alignment film material for homeotropically aligning a liquid crystal and a homogeneous alignment film material for homogeneously aligning a liquid crystal.

3. A liquid crystal device according to claim 2, wherein said homeotropic alignment film material comprises a compound having a molecular structure including a fluoroalkyl chain.

4. A liquid crystal device according to claim 3, wherein said homeotropic alignment film material comprises a polymeric compound having a recurring unit represented by the following formula (I) or (II):

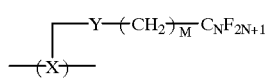

(I)

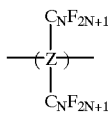

(II)

wherein X and Z each represent polyalkylene chain, polyacrylic acid chain, polymethacrylic acid chain, phthalogenoacrylic acid chain, polyalkylacrylic acid chain, polyoxyalkylene chain, polyimide chain, polyamide chain, polyeter chain, polyfluorinated alkyl chain or polycarbonate chain;

Y non-directionally represents a single bond,

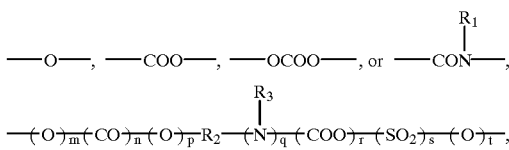

wherein $R_1$ and $R_2$ independently denote alkyl or hydrogen, $R_2$ denotes alkylene, and m, n, p, q, r, s and t independently denote 0 or 1;

M denotes an integer of 0–20, and

N (suffix) denotes an integer of 0–30.

5. A liquid crystal device according to any one of claims 1 and 2–4, wherein the alignment film has a surface energy of at most 42.1 dyne/cm.

6. A liquid crystal device according to any one of claims 1 and 2–4, wherein the alignment film has a surface energy of 37.4–40.9 dyne/cm.

7. A liquid crystal device according to any one of claims 1 and 2–4, wherein said nematic liquid crystal is a fluorine-containing nematic liquid crystal having a ratio $K_{33}/K_{22}$ of at most 4.12 between an elastic constant $K_{33}$ for bending and an elastic constant $K_{22}$ for twisting.

8. A liquid crystal device according to any one of claims 1 and 2–4, wherein said nematic liquid crystal is a fluorine-containing nematic liquid crystal having a ratio $K_{33}/K_{22}$ of at most 2.08 between an elastic constant $K_{33}$ for bending and an elastic constant $K_{22}$ for twisting.

9. A liquid crystal device according to claim 1, wherein the liquid crystal in a dark display state is set to have a retardation of at most 50 nm.

10. A liquid crystal device according to claim 1, wherein said retardation factor is set to be at least 0.12.

11. A liquid crystal device according to claim 1, wherein said retardation factor is set to be in a range of 0.17–0.27.

12. A liquid crystal device according to claim 1, wherein the alignment films on the pair of substrates have been rubbed in an identical direction.

* * * * *

UNITED STATES PATENT AND TRADEMARK OFFICE
CERTIFICATE OF CORRECTION

PATENT NO. : 6,221,444 B1
DATED : April 24, 2001
INVENTOR(S) : Shinjiro Okada et al.

It is certified that error appears in the above-identified patent and that said Letters Patent is hereby corrected as shown below:

Title page,
Item [56], OTHER PUBLICATIONS, "29, , Proceedings" should read -- 29, Proceedings --.

Column 1,
Line 46, "Initialization" should read -- "Initialization --;
Line 56, "of Kogakuin" should read -- at Kogakuin --; and
Line 58, "166-)" should read -- 166) --.

Column 3,
Line 41, "a rubbing" should read -- rubbing --.

Column 4,
Line 4, "have" should read -- has --.

Column 7,
Line 44, "($C_5H_7$)" should read -- ($C_3H_7$) --; and
Line 66, "each" should read -- with each --.

Column 13,
Line 30, "a-bromonaphthalene" should read -- α-bromonaphthalene --.

Column 14,
Line 26, "an" should read -- and --; and
Line 33, "±15.0" should read -- ±5.0 --.

Column 17,
Line 1, "high" should read -- higher --; and
Line 5, "was stable" should read -- was more stable --.

UNITED STATES PATENT AND TRADEMARK OFFICE
CERTIFICATE OF CORRECTION

PATENT NO.    : 6,221,444 B1
DATED         : April 24, 2001
INVENTOR(S)   : Shinjiro Okada et al.

It is certified that error appears in the above-identified patent and that said Letters Patent is hereby corrected as shown below:

<u>Column 18,</u>
Line 13, "polyeter" should read -- polyether --; and
Lines 34, 37, 40 and 45, "1 and 2-4," should read -- 1 and 1-4 --.

Signed and Sealed this

Twenty-ninth Day of July, 2003

JAMES E. ROGAN
*Director of the United States Patent and Trademark Office*